(12) United States Patent
Xiao et al.

(10) Patent No.: US 11,936,066 B2
(45) Date of Patent: Mar. 19, 2024

(54) LITHIUM ION-EXCHANGED ZEOLITE PARTICLES INCLUDING LITHIUM PHOSPHATE WITHIN CAGE, ELECTROCHEMICAL CELL, AND METHOD OF MAKING THE SAME

(71) Applicant: GM GLOBAL TECHNOLOGY OPERATIONS LLC, Detroit, MI (US)

(72) Inventors: Xingcheng Xiao, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 181 days.

(21) Appl. No.: 17/375,414

(22) Filed: Jul. 14, 2021

(65) Prior Publication Data
US 2023/0024073 A1 Jan. 26, 2023

(51) Int. Cl.
*H01M 50/431* (2021.01)
*C01B 39/14* (2006.01)
(Continued)

(52) U.S. Cl.
CPC ........... *H01M 50/431* (2021.01); *C01B 39/14* (2013.01); *C01B 39/24* (2013.01); *C01B 39/32* (2013.01);
(Continued)

(58) Field of Classification Search
CPC ............. H01M 50/431; H01M 50/497; H01M 50/491; H01M 50/451; C01B 39/14; C01B 39/24; C01B 39/32; C01B 39/38
(Continued)

(56) References Cited

U.S. PATENT DOCUMENTS 10,483,592 B2 11/2019 Xiao et al.
10,615,461 B2 4/2020 Xiao et al.
(Continued)

FOREIGN PATENT DOCUMENTS

CN 103864091 A * 6/2014
CN 106025338 A * 10/2016 ........ H01M 10/0525
(Continued)

OTHER PUBLICATIONS

Xu et al., Multifunctional Lithium-Ion-Exchanged Zeolite-Coated Separator for Lithium-Ion Batteries, Nov. 30, 2018, ACS Applied Energy Materials, 1, 7237-7243 (Year: 2018).*
(Continued)

*Primary Examiner* — Sean P Cullen
(74) *Attorney, Agent, or Firm* — Harness, Dickey & Pierce, P.L.C.

(57) ABSTRACT

Lithium ion-exchanged zeolite particles and methods of making such lithium ion-exchanged zeolite particles are provided herein. The method includes combining precursor zeolite particles with $(NH_4)_3PO_4$ to form a first mixture including intermediate zeolite particles including $NH_4^+$ cations. The method further includes adding a lithium salt to the first mixture to form the lithium ion-exchanged zeolite particles, or separating the intermediate zeolite particle from the first mixture and combining the intermediate zeolite particles with the lithium salt to form the lithium ion-exchanged zeolite particles.

19 Claims, 5 Drawing Sheets

(51) Int. Cl.

| | |
|---|---|
| *C01B 39/24* | (2006.01) |
| *C01B 39/32* | (2006.01) |
| *C01B 39/38* | (2006.01) |
| *H01M 10/0525* | (2010.01) |
| *H01M 50/451* | (2021.01) |
| *H01M 50/491* | (2021.01) |
| *H01M 50/497* | (2021.01) |

(52) U.S. Cl.
CPC ......... *C01B 39/38* (2013.01); *H01M 10/0525* (2013.01); *H01M 50/451* (2021.01); *H01M 50/491* (2021.01); *H01M 50/497* (2021.01)

(58) Field of Classification Search
USPC .......................... 429/145; 502/75, 77, 79, 86
See application file for complete search history.

(56) References Cited

U.S. PATENT DOCUMENTS

| | | | |
|---|---|---|---|
| 10,950,836 B2 | 3/2021 | Xiao et al. | |
| 11,557,758 B2 | 1/2023 | Liu et al. | |
| 2018/0254449 A1 | 9/2018 | Xiao et al. | |
| 2019/0229318 A1* | 7/2019 | Xiao | ................... H01M 50/491 |
| 2020/0403204 A1 | 12/2020 | Xiao et al. | |
| 2021/0083294 A1 | 3/2021 | Xiao et al. | |
| 2021/0159493 A1 | 5/2021 | Xiao et al. | |
| 2022/0200039 A1 | 6/2022 | Xiao et al. | |
| 2023/0024073 A1 | 1/2023 | Xiao et al. | |
| 2023/0035392 A1 | 2/2023 | Xiao et al. | |

FOREIGN PATENT DOCUMENTS

| | | | | |
|---|---|---|---|---|
| CN | 106384841 A | * | 2/2017 | .......... H01M 10/056 |
| CN | 115621663 A | | 1/2023 | |
| CN | 115693029 A | | 2/2023 | |
| DE | 102022109356 A1 | | 1/2023 | |
| DE | 102022109657 A1 | | 2/2023 | |

OTHER PUBLICATIONS

Liu, Jin et al., U.S. Appl. No. 16/863,655, filed Apr. 30, 2020 entitled "Solvent-Free Dry Powder Process To Incorporate Ceramic Particles Into Electrochemical Cell Components," 82 pages.

Xiao, Xingcheng et al., U.S. Appl. No. 17/128,905, filed Dec. 21, 2020 entitled "Lithium Battery Including Composite Flame Retardant Particles," 29 pages.

* cited by examiner

LITHIUM ION-EXCHANGED ZEOLITE PARTICLES INCLUDING LITHIUM PHOSPHATE WITHIN CAGE, ELECTROCHEMICAL CELL, AND METHOD OF MAKING THE SAME

INTRODUCTION

This section provides background information related to the present disclosure which is not necessarily prior art.

An electrochemical cell, such as a battery, is a device that converts chemical energy into electrical energy by means of electrochemical reduction-oxidation (redox) reactions. In secondary or rechargeable batteries, these electrochemical reactions are reversible, which allows the batteries to undergo multiple charging and discharge cycles.

High-energy density, electrochemical cells, such as lithium ion batteries can be used in a variety of consumer products and vehicles, such as Hybrid Electric Vehicles (HEVs) and Electric Vehicles (EVs). Typical lithium ion, lithium sulfur, and lithium metal batteries include a first electrode, a second electrode, an electrolyte material, and a separator. One electrode serves as a positive electrode or cathode and another serves as a negative electrode or anode. A stack of battery cells may be electrically connected to increase overall output. Conventional rechargeable lithium ion batteries operate by reversibly passing lithium-ions back and forth between the negative electrode and the positive electrode. A separator and an electrolyte are disposed between the negative and positive electrodes. The electrolyte is suitable for conducting lithium ions and may be in solid (e.g., solid state diffusion) or liquid form. Each of the negative and positive electrodes is typically carried on or connected to a metallic current collector, for example, in the form of a thin layer of electrode material. The current collectors may be connected to each other by an interruptible external circuit through which electrons can pass from one electrode to the other while lithium ions migrate in the opposite direction through the electrochemical cell during charging and discharge of the battery.

Lithium ion batteries can reversibly supply power to an associated load device on demand. More specifically, electrical power can be supplied to a load device by a lithium ion battery until the lithium content of the negative electrode is effectively depleted. The battery may then be recharged by passing a suitable direct electrical current in the opposite direction between the electrodes.

During discharge, the negative electrode may contain a relatively high concentration of intercalated lithium, which is oxidized into lithium ions and electrons. The lithium ions travel from the negative electrode (anode) to the positive electrode (cathode), for example, through the ionically conductive electrolyte solution contained within the pores of an interposed porous separator. At the same time, the electrons pass through the external circuit from the negative electrode to the positive electrode. The lithium ions may be assimilated into the material of the positive electrode by an electrochemical reduction reaction. The battery may be recharged after a partial or full discharge of its available capacity by an external power source, which reverses the electrochemical reactions that transpired during discharge.

During recharge, intercalated lithium in the positive electrode is oxidized into lithium ions and electrons. The lithium ions travel from the positive electrode to the negative electrode through the porous separator via the electrolyte, and the electrons pass through the external circuit to the negative electrode. The lithium cations are reduced to elemental lithium at the negative electrode and stored in the material of the negative electrode for reuse.

Lithium ion-exchanged zeolite particles, for example, present in a coating layer on a porous separator, can actively remove trace water, hydrogen ions, hydrofluoric acid, dissociated transition metal ions (e.g., $Mn^{2+}$, $Fe^{2+}$, and $Fe^{3+}$ ions), polysulfides, and other target compounds from the liquid electrolyte without inhibiting the transport or net flow of lithium ions therethrough. The removal of these target compounds from the liquid electrolyte during operation of the battery can, in turn, help prevent or mitigate degradation of various battery components and thereby improve the life and cycle performance of the battery. However, it can be difficult to produce such lithium ion-exchange zeolite particles, in particular, it may be difficult to achieve an exchange between lithium ions having a larger hydrated radius and cations with a smaller hydrated radius, such as sodium and potassium cations. Thus, further methods for ion-exchanging zeolite particles are needed.

SUMMARY

This section provides a general summary of the disclosure, and is not a comprehensive disclosure of its full scope or all of its features.

The present disclosure relates to a method of preparing lithium ion-exchanged zeolite particles. The method includes combining precursor zeolite particles with $(NH_4)_3PO_4$ to form a first mixture including intermediate zeolite particles. The precursor zeolite particles include a cation selected from the group consisting of $H^+$, $NH_4^+$, $Na^+$, $K^+$, $Mg^{2+}$, $Ca^+$, and a combination thereof. The method may further include adding a lithium salt to the first mixture to form the lithium ion-exchanged zeolite particles. Alternatively, the method may include separating the intermediate zeolite particle from the first mixture and combining the intermediate zeolite particles with the lithium salt to form the lithium ion-exchanged zeolite particles. The lithium ion-exchanged zeolite particles include $Li^+$ and $NH_4^+$ cations.

The lithium ion-exchanged zeolite particles include cages defined by 8-membered rings, 9-membered rings, 10-membered rings, 12-membered rings or a combination thereof. The cages can contain $Li_3PO_4$.

The lithium ion-exchanged zeolite particles may further include $Li_3PO_4$ present on an exterior surface of the lithium ion-exchanged zeolite particles.

The lithium ion-exchanged zeolite particles include a zeolite material having a framework type, such as NAT, EDI, THO, ANA, YUG, GOO, MON, HEU, STI, BRE, FAU, MFI, LTL, LTA, or a combination thereof. For example, the zeolite material may be selected from the group consisting of zeolite A, zeolite Y, zeolite L, ZSM-5, and a combination thereof.

The precursor zeolite particles may include $Na^+$, $H^+$, and/or $K^+$ cations and/or the intermediate zeolite particle may include $NH_4^+$ cations.

The lithium salt may be selected from the group consisting of lithium hydroxide, lithium carbonate, lithium chloride, lithium nitrate, lithium sulfate, and a combination thereof.

In the method, the combining the precursor zeolite particles with $(NH_4)_3PO_4$, the adding LiOH to the first mixture to form the lithium ion-exchanged zeolite particles, and the combining the intermediate zeolite particles with LiOH to form the lithium ion-exchanged zeolite particles may each be performed at a temperature of about 18° C. to about 120° C.

The method may further include separating the lithium ion-exchanged zeolite particles; and/or heating the lithium ion-exchanged zeolite particles, for example, at a temperature of greater than or equal to about 100° C.

In yet other aspects, the present disclosure relates to a lithium ion-exchanged zeolite particle. The lithium ion-exchanged zeolite particle includes cages defined by 8-membered rings, 9-membered rings, 10-membered rings, 12-membered rings or a combination thereof. The cages include $Li_3PO_4$. The lithium ion-exchanged zeolite particle can further include $Li^+$ and $NH_4^+$ cations.

The lithium ion-exchanged zeolite particle include a zeolite material having a framework type selected from the group consisting of NAT, EDI, THO, ANA, YUG, GOO, MON, HEU, STI, BRE, FAU, MFI, LTL, LTA, and a combination thereof. For example, the zeolite material may be selected from the group consisting of zeolite A, zeolite Y, zeolite L, ZSM-5, and a combination thereof.

In yet other aspects, the present disclosure relates to an electrochemical cell. The electrochemical cell includes a positive electrode including a first electroactive material and a negative electrode spaced apart from the positive electrode, wherein the negative electrode includes a second electroactive material. The electrochemical cell further includes a porous separator disposed between confronting surfaces of the negative electrode and the positive electrode and a liquid electrolyte infiltrating one or more of the negative electrode, the positive electrode, and the porous separator. The electrochemical cell further includes lithium ion-exchanged zeolite particles including cages defined by 8-membered rings, 9-membered rings, 10-membered rings, 12-membered rings or a combination thereof. The cages include $Li_3PO_4$. The lithium ion-exchanged zeolite particle can further include $Li^+$ and $NH_{4^+}$ cations.

The lithium ion-exchanged zeolite particles may be present as one or more of the following: (i) a first coating layer present on a first side, a second side or both the first and second sides of the porous separator, (ii) a filler in the porous separator; (iii) an additive in the positive electrode, the negative electrode, or both; and (iv) a second coating layer present on a third side of the negative electrode, on a fourth side of the positive electrode or both the third side of the negative electrode and the fourth side of the positive electrode.

The lithium ion-exchanged zeolite particles include a zeolite material having a framework type selected from the group consisting of NAT, EDI, THO, ANA, YUG, GOO, MON, HEU, STI, BRE, FAU, MFI, LTL, LTA, and a combination thereof. For example, the zeolite material may be selected from the group consisting of zeolite A, zeolite Y, zeolite L, ZSM-5, and a combination thereof.

The first electroactive material may be selected from the group consisting of $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P \leq 1$, $x+y+z+p=1$ (NCMA); $LiNiMnCoO_2$; $Li_2Fe_xM_{1-x}PO_4$, where M is Mn and/or Ni, $0 \leq x \leq 1$; $LiMn_2O_4$; $LiFeSiO_4$; $LiNi_{0.6}Mn_{0.2}Co_{0.2}O_2$ (NMC622), $LiMnO_2$ (LMO), activated carbon, sulfur, and a combination thereof.

The second electroactive material includes lithium, a lithium silicon alloy, a lithium aluminum alloy, a lithium indium alloy, a lithium tin alloy, graphite, activated carbon, carbon black, hard carbon, soft carbon, graphene, silicon, tin oxide, aluminum, indium, zinc, germanium, silicon oxide, titanium oxide, lithium titanate, or a combination thereof.

The porous separator includes a composite material, a polymeric material, a nonwoven material, or a combination thereof.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

I. Lithium Ion-Exchanged Zeolite Particles and Methods of Making the Same

Lithium ion-exchanged zeolite particles are provided herein. The lithium ion-exchanged zeolite particles may comprise or consist essentially of particles of one or more natural or synthetic zeolite materials. As used herein, "zeolite" is defined to refer to a synthetic or natural crystalline material having a porous framework structure built from tetrahedra atoms (e.g., silicon, aluminum, phosphorus) connected by bridging oxygen atoms. Zeolites can comprise a three-dimensional framework of $AlO_2$ and $SiO_2$ tetrahedral units and extra-framework cations. Each $AlO_2$ unit introduces one negative charge to the framework, which is offset by the extra-framework cations. The extra-framework cations may be organic or inorganic in nature. As used herein, the term "lithium ion-exchanged zeolite particle" means a zeolite that has been ion-exchanged with lithium ions such that a plurality of lithium ions are present within the zeolite as free ions and/or as extra-framework ions.

In various aspects, the lithium ion-exchanged zeolite particles may comprise a three-dimensional framework of $AlO_2$ and $SiO_2$ tetrahedral units and extra-framework lithium cations ($Li^+$). The amount of extra-framework lithium cations present in the lithium ion-exchanged zeolite particles can at least partially depend on the Si:Al ratio of the specific zeolite material and the cation exchange capacity (CEC) of the zeolite material. In the lithium ion-exchanged zeolite particles, lithium cations ($Li^+$) may comprise greater than or equal to about 90 atomic % (at. %), greater than or equal to about 95 at. %, greater than or equal to 99 at. %, or about 100 at. % of the extra-framework cations in the zeolite particles. In some embodiments, the zeolite may be in dehydrated form.

The zeolite framework has voids or pores in the form of cages or channels between the tetrahedra, which are defined by rings of interconnected oxygen (O), silicon (Si), phosphorus (P) and/or aluminum (Al) atoms. Zeolite particles may have an average pore size diameter of less than or equal to about 1.5 nm, less than or equal to about 1 nm, less than or equal to about 0.75 nm, less than or equal to about 0.5 nm, less than or equal to about 0.25 nm, less than or equal to about 0.1 nm, or about 0.05 nm. Additionally or alternatively, the zeolite particles may have an average pore size diameter of greater than or equal to about 0.1 nm to less than or equal to about 1.5 nm, greater than or equal to about 0.1 nm to less than or equal to about 1 nm, or greater than or equal to about 0.35 nm to less than or equal to about 0.7 nm. Zeolite materials having pore openings with widths or diameters as described above may include zeolite materials having pore openings defined by 8-membered, 9-membered, 10-membered, and/or 12-membered rings.

Examples of known zeolite frameworks are given in the "Atlas of Zeolite Frameworks" published on behalf of the Structure Commission of the International Zeolite Association", 6$^{th}$ revised edition, Ch. Baerlocher, L. B. McCusker, D. H. Olson, eds., Elsevier, New York (2007) and the corresponding web site, http://www.iza-structure.org/databases/. Under this definition, a zeolite can refer to aluminosilicates having a zeolitic framework type as well as crystalline structures containing oxides of heteroatoms different from silicon and aluminum. Such heteroatoms can include any heteroatom generally known to be suitable for inclusion in a zeolitic framework, such as gallium, boron, germanium, phosphorus, zinc, antimony, tin, and/or other transition metals that can substitute for silicon and/or aluminum in a zeolitic framework.

In some embodiments, the lithium ion-exchanged zeolite particles, for example, prior to operation in an electrochemical cell, may comprise less than or equal to about 10 at. %, less than or equal to about 5 at. %, less than or equal to about 1 at. %, less than or equal to about 0.5 at. % or less than or equal to about 0.1 at. % of one or more of the following extra-framework cations: $Na^+$, $K^+$, $Mg^{2+}$, $Ca^+$, $H^+$, and $NH_4^+$. In some embodiments, the lithium ion-exchanged zeolite particles may comprise less than or equal about 1 at. % or less than or equal to about 0.1 at % of one or more of $Na^+$, $H^+$, $Ca^+$, $K^+$, and/or $NH_4^+$. In some embodiments, the lithium ion-exchanged zeolite particles may comprise $NH_4^+$ in an amount greater than one or more of the following cations: $Na^+$, $K^+$, $Mg^{4+}$, and $Ca^+$. Additionally or alternatively, the lithium ion-exchanged zeolite particles may be substantially free of one or more of: $Na^+$, $K^+$, $Mg^{2+}$, and $Ca^+$ cations.

Figure 1A:
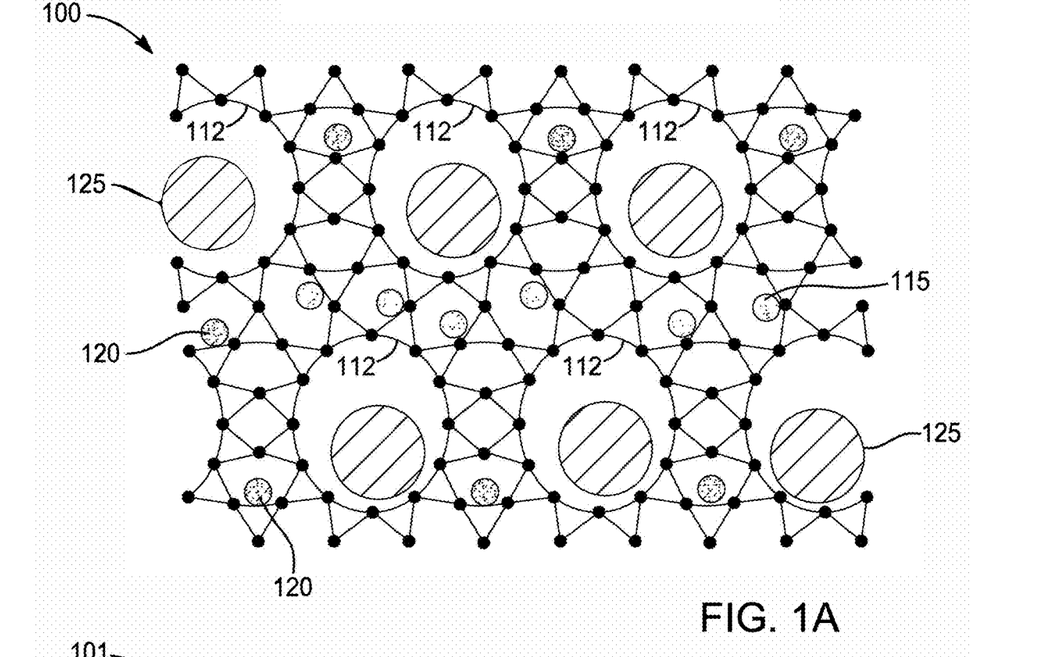
FIG. 1A is an illustration of an exemplary lithium ion-exchanged zeolite particle according to the present disclosure.
Figure 1B:
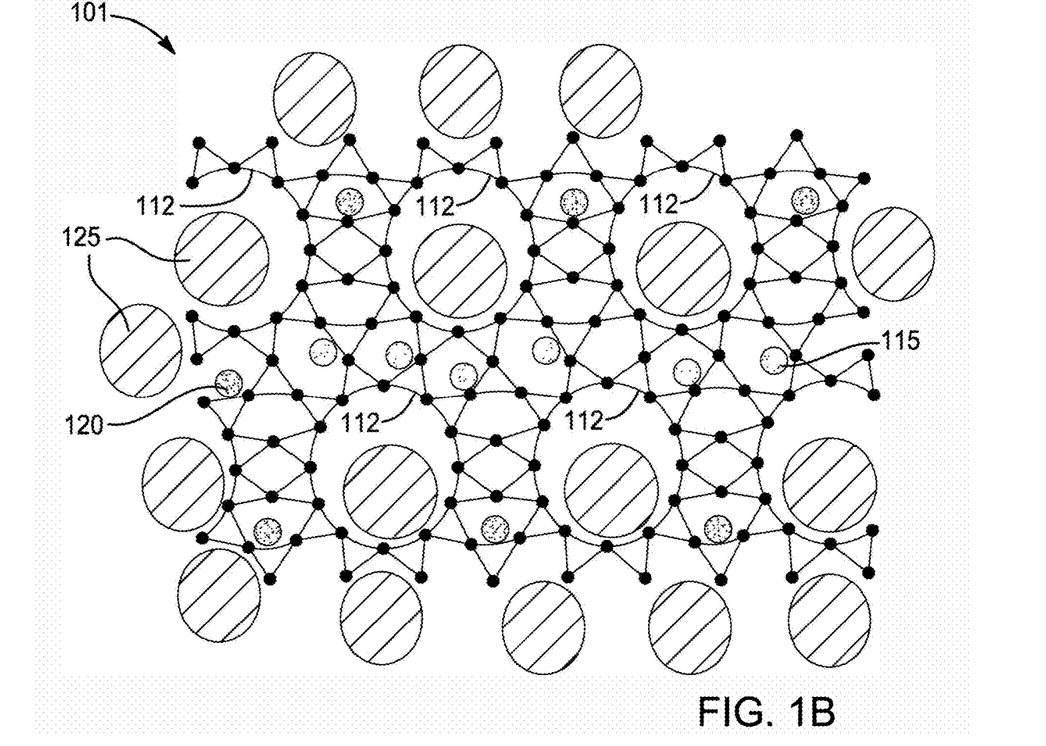
FIG. 1B is an illustration of an alternative exemplary lithium ion-exchanged zeolite particle according to the present disclosure.

As depicted in FIG. 1A, a lithium ion-exchanged zeolite particle 100 as provided herein may include $Li^+$ cations 115 and $NH_4^+$ cations 120, for example, as extra framework cations. Additionally, the lithium ion-exchanged zeolite particle may also include a $Li_3PO_4$ complex 125. As illustrated in FIG. 1A, the $Li_3PO_4$ complex 125 may be present within cages 112 of the lithium ion-exchanged zeolite particle 100. In other words, the cages 112 may include or comprise one or more $Li_3PO_4$ complex 125. Additionally or alternatively, as depicted in FIG. 1B, $Li_3PO_4$ complex 125 may also be present an exterior surface of the lithium ion-exchanged zeolite particle 101.

In any embodiment, the lithium ion-exchanged zeolite particles may have an average particle diameter of less than or equal to about 20 μm, less than or equal to about 15 μm, less than or equal to about 10 μm, less than or equal to about 5 μm, less than or equal to about 1 μm, less than or equal to about 100 nm, less than or equal to about 50 nm, or about 10 nm. Additionally or alternatively, the lithium ion-exchanged zeolite particles may have an average particle diameter of greater than or equal to about 10 nm to less than or equal to about 20 μm, greater than or equal to about 10 nm to less than or equal to about 10 μm, greater than or equal to about 10 nm to less than or equal to about 5 μm or greater than, or equal to about 10 nm to less than or equal to about 1 μm.

The crystal structures of zeolites include interstitial spaces (or cages) of molecular dimensions. As such, zeolites may be used as adsorbents to selectively adsorb molecules by retaining the molecules within their interstitial spaces. Access to the interstitial spaces within a zeolite is provided by pore openings (or channels) in the crystal lattice of the zeolite, which are defined by rings of interconnected oxygen (O), silicon (Si), and/or aluminum (Al) atoms. The size and shape of these pore openings limit the size and shape of the molecules that can be adsorbed by the zeolite and are determined, at least in part, by the number of tetrahedral units (or, alternatively, oxygen atoms) that make up the rings and by the type of extra-framework cations present within the zeolite. Thus, the lithium-exchanged zeolite particles may have an average pore size diameter capable of one or more of the following: (i) selectively absorbing water molecules (e.g., trace amounts) from the liquid electrolyte, without adsorbing the organic solvent molecules or the lithium salt ions in the electrolyte solution in the electrolyte; and (ii) allowing substantially only $Li^+$ ions through the separator while blocking polysulfide migration, for example, in a lithium sulfur battery. In some embodiments, the lithium ion-exchanged zeolite particles may have an average pore size diameter larger than the ionic radius of water ($H_2O$), but less than the ionic radius of the organic solvent molecules in the electrolyte solution. In particular, the lithium ion-exchanged zeolite particles may have an average pore size diameter of less than or equal to about 1.5 nm, less than or equal to about 1 nm, less than or equal to about 0.75 nm, less than or equal to about 0.5 nm, less than or equal to about 0.25 nm, less than or equal to about 0.1 nm, or about 0.05 nm. Additionally or alternatively, the lithium ion-exchanged zeolite particles may have an average pore size diameter of greater than or equal to about 0.05 nm to less than or equal to about 1.5 nm, greater than or equal to about 0.05 nm to less than or equal to about 1 nm, greater than or equal to about 0.1 nm to less than or equal to about 1 nm, or greater than or equal to about 0.25 nm to less than or equal to about 0.75 nm. Zeolite materials having pore openings with widths or diameters as described above may include zeolite materials having pore openings defined by 8-membered, 9-membered, 10-membered, and/or 12-membered rings.

In some embodiments, the lithium ion-exchanged zeolite particles may comprise particles of a zeolite material having a $SiO_2:Al_2O_3$ ratio of less than or equal to about 50, less than or equal to about 40, less than or equal to about 30, less than or equal to about 20, or about 10. The lithium ion-exchanged zeolite particles may comprise particles of a zeolite material having a $SiO_2:Al_2O_3$ ratio in the range of greater than or equal to about 10 to less than or equal to about 50, greater than or equal to about 10 to less than or equal to about 40, greater than or equal to about 10 to less than or equal to about 20, greater than or equal to about 20 to less than or equal to about 50, about 20 to about 40, or about 30 to about 50. In some embodiments, lithium ion-exchanged zeolite particles with more $SiO_2$ compared to $Al_2O_3$, for example, having a $SiO_2:Al_2O_3$ ratio greater than about 10, are preferred, for example, for increased stability. In other embodiments, lithium ion-exchanged zeolite particles with more $Al_2O_3$ compared to $SiO_2$, for example, having a $SiO_2:Al_2O_3$ ratio less than about 10, are provided, for example, for an increased hydrofluoric acid (HF) scavenger function of the porous separator to protect the positive electrode.

The lithium ion-exchanged zeolite particles may comprise a zeolite material having a framework type selected from the group consisting of NAT, EDI, THO, ANA, YUG, GOO, MON, HEU, STI, BRE, FAU, MFJ, LTL, LTA, and a combination thereof. For example, the lithium ion-exchanged zeolite particles may comprise a zeolite material selected from the group consisting of zeolite A, zeolite Y, zeolite L, ZSM-5, and a combination thereof.

Methods of preparing the lithium ion-exchanged zeolite particles are provided herein. The zeolite particles prior to ion-exchange with lithium are referred to herein as "precursor zeolite particles." The precursor zeolite particles may have a framework selected from the group consisting of NAT, EDI, THO, ANA, YUG, GOO, MON, HEU, STI, BRE, FAU, MFJ, LTL, LTA, and a combination thereof. For example, the precursor zeolite particles may comprise a zeolite material selected from the group consisting of zeolite A, zeolite Y, zeolite L, ZSM-5, and a combination thereof. Furthermore, the precursor zeolite particles and the lithium ion-exchanged zeolite particles formed therefrom may have substantially the same pore size diameter, substantially the same particle size diameter and substantially the same $SiO_2:Al_2O_3$ ratio as described herein. For example, ZSM-5 particles (precursor zeolite particles) having an average pore diameter of about 0.5 nm, an average particle size diameter of 100 nm and a $SiO_2:Al_2O_3$ ratio of about 20 may be ion-exchanged to form lithium ion-exchanged ZSM-5 particles having substantially the same pore size diameter, particle size diameter, and $SiO_2:Al_2O_3$ ratio as the initial ZSM-5 particles. It is contemplated herein, that following ion-exchange of the precursor zeolite particles, the resultant lithium ion-exchanged zeolite particles may have some variation (e.g., about 1-5%) in pore size diameter, particle size diameter and $SiO_2:Al_2O_3$ ratio compared to the precursor zeolite particles.

The precursor zeolite particles may have as initial exchangeable cations one or more hydrogen-containing ions or ions of an alkali metal or an alkaline earth metal. In particular, the precursor zeolite particles may have as initial exchangeable cations one or more ions of hydrogen, ammonium, lithium, sodium, potassium, rubidium, cesium, francium, beryllium, magnesium, calcium, strontium, barium, and radium. In some embodiments, the precursor zeolite particles may comprise one or more of the following cations: $H^+$, $NH_4^+$, $Na^+$, $K^+$, $Mg^{2+}$, and/or $Ca^+$.

Figure 2A:
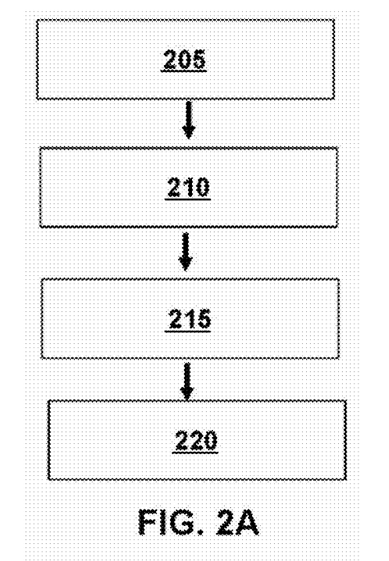
FIG. 2A is a flow diagram of an exemplary method of preparing lithium ion-exchanged zeolite particles according to the present disclosure.

The method may include obtaining a suitable amount of precursor zeolite particles in powder form and having exchangeable extra-framework cations. For example, as illustrated in FIG. 2A, the method may include a step 205 of combining precursor zeolite particles with $(NH_4)_3PO_4$, for example, in a first container, at a sufficient temperature and for a sufficient amount of time for at least some of the exchangeable extra-framework cations (e.g., $Na^+$, $H^+$, $K^+$) within the zeolite precursor particles to be replaced or exchanged with $NH_4^+$ ions to produce a first mixture comprising intermediate zeolite particles, for example, comprising $NH_4^+$ cations. The $(NH_4)_3PO_4$ may be present in an aqueous or non-aqueous solution (i.e., solvent solution) and the precursor zeolite particles may undergo mixing with $(NH_4)_3PO_4$.

Step 205 may be performed at a temperature of greater than or equal to about 18° C., greater than or equal to about 20° C., greater than or equal to about 25° C., greater than or equal to about 30° C., greater than or equal to about 50° C., greater than or equal to about 80° C., greater than or equal to about 100° C., greater than or equal to about 120° C., or about 150° C.; from about 18° C. to about 150° C., about 18° C. to about 120° C., about 25° C. to about 120° C., about 50° C. to about 100° C., or about 80° C. to about 120° C. Additionally or alternatively, step 205 may be performed for greater than or equal to about 5 minutes, greater than or equal to about 15 minutes, greater than or equal to about 30 minutes, greater than or equal to about 60 minutes, greater than or equal to about 6 hours, greater than or equal to about 12 hours, greater than or equal to about 18 hours, greater than or equal to about 24 hours, or about 48 hours; or from about 5 minutes to about 48 hours, about 5 minutes to about 24 hours, about 30 minutes to about 48 hours, about 30 minutes to about 24 hours, about 60 minutes to about 48 hours, about 60 minutes to about 24 hours, about 6 hours to about 24 hours, about 12 hours to about 24 hours, about 18 hours to about 24 hours, or about 24 hours to about 48 hours.

In any embodiment, the method may include a step 210, wherein a lithium salt may be added to the first mixture, for example, in the first container, at a sufficient temperature and for a sufficient amount of time for at least some of the exchangeable extra-framework cations (e.g., $NH_4^+$, $Na^+$, $H^+$, $K^+$) within the intermediate zeolite particles to be replaced or exchanged with $Li^+$ ions to produce a the lithium ion-exchanged zeolite particles as described herein. The lithium salt may be present in an aqueous or non-aqueous solution (i.e., solvent solution) and the intermediate zeolite particles may undergo mixing with the lithium salt. The lithium salt may comprise lithium hydroxide (LiOH), lithium carbonate ($Li_2CO_3$), lithium chloride (LiCl), lithium nitrate ($LiNO_3$), lithium sulfate ($Li_2SO_4$), or a combination thereof. In one embodiment, the lithium salt may be LiOH. The concentration of the lithium salt in the solution may be in the range of 0.1 M to 2 M and may be adjusted during the lithium ion-exchange method to ensure a sufficient amount of the initial exchangeable cations in the intermediate zeolite particles is replaced with lithium ions, for example, $NH_4^+$ cations replaced with $Li^+$ cations. The addition of a lithium salt to the first mixture can be represented by the exemplary reaction equation (1) below:

$$3LiOH + (NH_4)_3PO_4 = Li_3PO_4\downarrow + 3NH_3\uparrow + 3H_2O \qquad (1).$$

The $Li_3PO_4$ formed during the reaction can be present within the cages of the lithium ion-exchanged zeolite particles as described above. Additionally or alternatively, the $Li_3PO_4$ formed during the reaction can be present on exterior surface the lithium ion-exchanged zeolite particles as described above. It is contemplated herein that the concentration of $(NH_4)_3PO_4$ and the lithium salt (e.g., LiOH) may be adjusted, based on the amount of cations in the precursor zeolite material, to ensure that $Li_3PO_4$ forms inside the cages of the zeolite particles.

Step 210 may be performed at a temperature of greater than or equal to about 18° C., greater than or equal to about 20° C., greater than or equal to about 25° C., greater than or equal to about 30° C., greater than or equal to about 50° C., greater than or equal to about 80° C., greater than or equal to about 100° C., greater than or equal to about 120° C., or about 150° C.; from about 18° C. to about 150° C., about 18° C. to about 120° C., about 25° C. to about 120° C., about 50° C. to about 100° C., or about 80° C. to about 120° C. Additionally or alternatively, step 210 may be performed for greater than or equal to about 5 minutes, greater than or equal to about 15 minutes, greater than or equal to about 30 minutes, greater than or equal to about 60 minutes, greater than or equal to about 6 hours, greater than or equal to about 12 hours, greater than or equal to about 18 hours, greater than or equal to about 24 hours, or about 48 hours; or from about 5 minutes to about 48 hours, about 5 minutes to about 24 hours, about 30 minutes to about 48 hours, about 30 minutes to about 24 hours, about 60 minutes to about 48 hours, about 60 minutes to about 24 hours, about 6 hours to about 24 hours, about 12 hours to about 24 hours, about 18 hours to about 24 hours, or about 24 hours to about 48 hours.

It has been discovered that by first exchanging the extra framework cations (e.g., $Na^+$, $H^+$, $K^+$), for example, with a smaller hydrated radius, within the precursor zeolite particles with $NH_4^+$ cations (e.g., in step 205), the $NH_4^+$ cations can then be more readily and easily exchanged with $Li^+$ cations (e.g., in step 210). Removal of undesirable cations, such as $Na^+$ and $K^+$, from the zeolite particles is beneficial because such undesirable cations can cause contamination in the electrolyte of the battery. Furthermore, incorporation of $Li_3PO_4$ in the zeolite particles is advantageous because $Li_3PO_4$ has fire retardant properties and can help prevent a fire during a thermal runaway event for the battery.

Additionally or alternatively, the method may further include an optional step 215 comprising separating the lithium ion-exchanged zeolite particles from the solvent or water after ion exchange is complete. The lithium ion-exchanged zeolite particles may be separated by any suitable method, for example, by centrifuge or filtering. The lithium ion-exchanged zeolite particles may be cleaned or washed by removing residual ions and solvent therefrom, for example, by being washed with deionized water. Additionally or alternatively, the method may include an optional step 220 comprising heating the separated lithium ion-exchanged zeolite particles at a suitable temperature for a sufficient amount of time to remove adsorbed water therefrom. The lithium ion-exchanged zeolite particles may be calcined in a dry environment or in a vacuum to accelerate the water removal process. For example, the lithium ion-exchanged zeolite particles may be calcined in an environment having less than 20% relative humidity, or in an environment as dry as possible. Step 220 may be performed at a temperature of greater than or equal to about 100° C., greater than or equal to about 200° C., greater than or equal to about 300° C., greater than or equal to about 400° C., greater than or equal to about 500° C., or about 600° C.; or from about 100° C. to about 600° C., about 200° C. to about 600° C., about 300° C. to about 600° C., about 400° C. to about 600° C., or about 200° C. to about 600° C. Additionally or alternatively, step 220 may be performed for greater than or equal to about 5 minutes, greater than or equal to about 15 minutes, greater than or equal to about 30 minutes, greater than or equal to about 60 minutes, greater than or equal to about 2 hours, greater than or equal to about 3 hours, greater than or equal to about 4 hours, greater than or equal to about 6 hours, greater than or equal to about 8 hours, greater than or equal to about 10 hours, greater than or equal to about 16 hours, greater than or equal to about 20 hours or about 24 hours; or from about 5 minutes to about 24 hours, about 5 minutes to about 16 hours, about 5 minutes to about 10 hours, about 5 minutes to about 4 hours, about 30 minutes to about 24 hours, about 30 minutes to about 8 hours, about 30 minutes to about 4 hours, about 60 minutes to about 24 hours, about 60 minutes to about 6 hours, about 60 minutes to about 5 hours, about 60 minutes to about 4 hours, about 2 hours to about 24 hours, about 2 hours to about 10 hours, about 2 hours to about 5 hours, about 2 hours to about 4 hours, about 4 hours to about 24 hours, or about 4 hours to about 8 hours. In one embodiment, the lithium ion-exchanged zeolite particles may be calcined by being heated at a temperature in the range of about 400-600° C. for a time between 1 to 5 hours, for example, the lithium ion-exchanged zeolite particles may be calcined by being heated at a temperature of about 400° C. for about 4 hours.

Atmospheric moisture may be readily absorbed by the lithium ion-exchanged particles after calcination. Therefore, to avoid introducing water into the electrochemical cell along with the lithium ion-exchanged zeolite particles, care should be taken to avoid exposing the particles to atmospheric moisture after the calcination step is complete, prior to and during assembly of the cell. For example, prior to incorporating the lithium ion-exchanged zeolite particles in the electrochemical cell, the particles may be transferred from step 220 and stored in a dry environment. If the lithium ion-exchanged zeolite particles are exposed to water, including atmospheric moisture, at any point prior to assembly of the electrochemical cell, an additional heat treatment step may be performed to eliminate trace water from the particles. The additional heat treatment step may be performed at a temperature greater than about 100° C. for a sufficient time to remove trace water from the lithium ion exchanged zeolite particles.

Figure 2B:
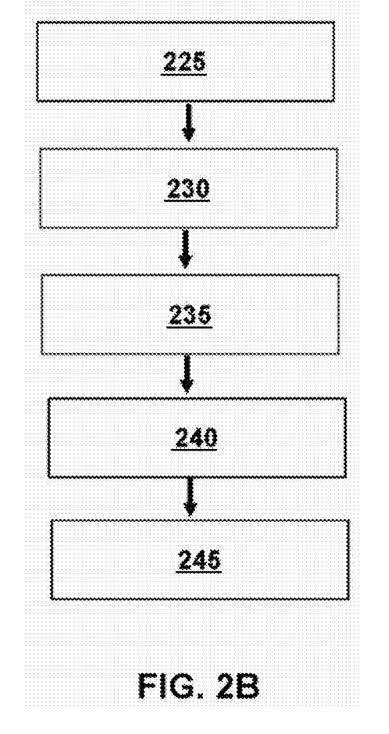
FIG. 2B is a flow diagram of an alternative exemplary method of preparing lithium ion-exchanged zeolite particles according to the present disclosure.

In a further embodiment, an alternative method for preparing lithium ion-exchanged zeolite particles is provided. For example, as depicted in FIG. 2B, the method may include a step 225 of combining precursor zeolite particles with $(NH_4)_3PO_4$, for example, in a first container, at a sufficient temperature and for a sufficient amount of time for at least some of the exchangeable extra-framework cations (e.g., $Na^+$, $H^+$, $K^+$) within the zeolite precursor particles to be replaced or exchanged with $NH_4^+$ ions to produce a first mixture comprising intermediate zeolite particles, for example, comprising $NH_4^+$ cations. Step 225 may be performed as described herein for step 205.

The method may further include a step 230 of separating the intermediate zeolite particles from the solvent or water solution containing $(NH_4)_3PO_4$. The intermediate zeolite particles may be separated by any suitable method, for example, by centrifuge or filtering. The intermediate zeolite particles may be cleaned or washed by removing residual ions and solvent therefrom, for example, by being washed with deionized water. Additionally, in step 235, the separated intermediate zeolite particles may be combined with a lithium salt as described herein to form the lithium ion-exchanged zeolite particles as described herein. Step 235 may be performed as described herein for step 210.

Additionally or alternatively, the method may further include a step 240 comprising separating the lithium ion-exchanged zeolite particles from the solvent or water after ion exchange is complete. Step 240 may be performed as described herein for step 215. Additionally or alternatively, the method may include an optional step 245 comprising heating the lithium ion-exchanged zeolite particles at a suitable temperature for a sufficient amount of time to remove adsorbed water therefrom. Step 245 may be performed as described herein for step 220.

II. Electrochemical Cell

Lithium-containing electrochemical cells typically include a negative electrode, a positive electrode, an electrolyte for conducting lithium ions between the negative and positive electrodes, and a porous separator between the negative electrode and the positive electrode to physically separate and electrically insulate the electrodes from each other while permitting free ion flow. When assembled in an electrochemical cell, for example, in a lithium-ion battery, the porous separator is infiltrated with a liquid electrolyte. It has been discovered that lithium ion-exchanged zeolite particles as described, for example, present in the electroactive material of the positive electrode and/or in a coating layer on the porous separator, can actively remove trace water, hydrogen ions, hydrofluoric acid, dissociated transition metal ions (e.g., $Mn^{2+}$ and $Fe^{2+/3+}$ ions), polysulfides, and other target compounds from the liquid electrolyte without inhibiting the transport or net flow of lithium ions therethrough. The removal of these target compounds from the liquid electrolyte during operation of the battery can, in turn, help prevent or mitigate degradation of various battery components and thereby improve the life and cycle performance of the battery.

Figure 3:
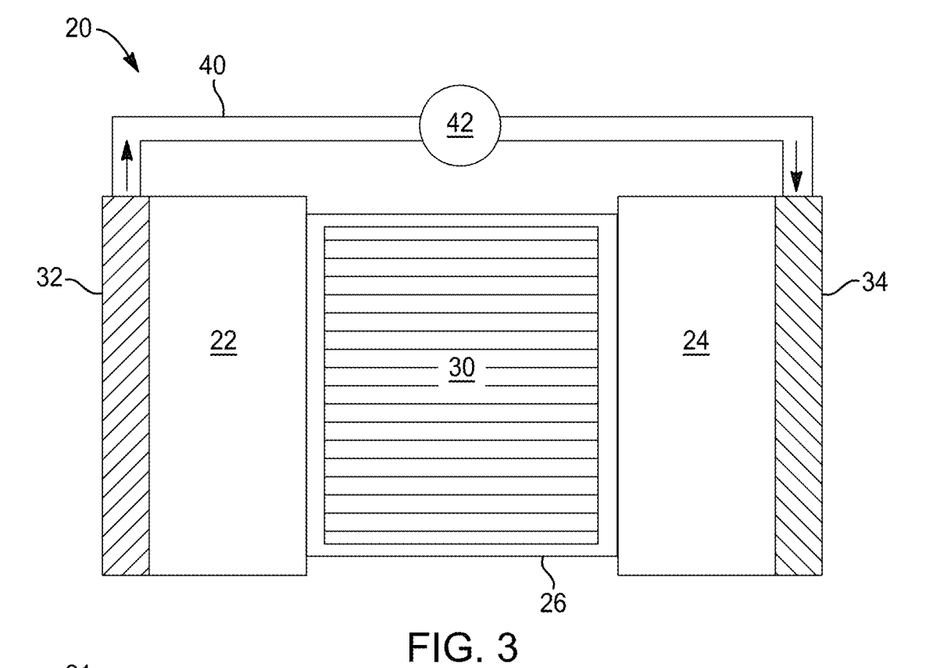
FIG. 3 is a schematic of an exemplary electrochemical battery cell according to the present disclosure.

An electrochemical cell for use in batteries, for example, a lithium ion battery, or as capacitors is provided herein. For example, an exemplary and schematic illustration of an electrochemical cell 20 (also referred to as the lithium ion battery or battery 20) is shown in FIG. 3. Electrochemical cell 20 includes a negative electrode 22 (also referred to as a negative electrode layer 22), a first current collector 32 (also referred to as a negative electrode current collector 32) may be positioned at or near the negative electrode 22, a positive electrode 24 (also referred to as a positive electrode layer 24), a second current collector 34 (also referred to as a positive electrode current collector 34) may be positioned at or near the positive electrode 24, and a separator 26 disposed between the positive electrode 24 and the first current collector 32. The space between (e.g., the separator 26) the negative electrode 22 and positive electrode 24 can be filled with the electrolyte 30. If there are pores inside the negative electrode 22 and/or the positive electrode 24, the pores may also be filled with the electrolyte 30. The electrolyte 30 can impregnate, infiltrate, or wet the surfaces of and fills the pores of each of the negative electrode 22, the positive electrode 24, and the porous separator 26.

The first current collector 32 and second current collector 34 respectively collect and move free electrons to and from an external circuit 40. An interruptible external circuit 40 and load device 42 connects the first current collector 32 and the second current collector 34. Each of the negative electrode 22, the positive electrode 24, and the separator 26 may further comprise the electrolyte 30 capable of conducting lithium ions. The separator 26 operates as both an electrical insulator and a mechanical support, by being sandwiched the negative electrode 22 and the positive electrode 24 to prevent physical contact and thus, the occurrence of a short circuit. The separator 26, in addition to providing a physical barrier between the electrodes 22, 24 can provide a minimal resistance path for internal passage of lithium ions (and related anions) for facilitating functioning of the battery 20. The separator 26 also contains the electrolyte solution in a network of open pores during the cycling of lithium ions, to facilitate functioning of the battery 20.

The battery 20 can generate an electric current during discharge by way of reversible electrochemical reactions that occur when the external circuit 40 is closed (to connect the negative electrode 22 and the positive electrode 24) when the negative electrode 22 contains a relatively greater quantity of inserted lithium. The chemical potential difference between the positive electrode 24 and the negative electrode 22 drives electrons produced by the oxidation of inserted lithium at the negative electrode 22 through the external circuit 40 toward the positive electrode 24. Lithium ions, which are also produced at the negative electrode, are concurrently transferred through the electrolyte 30 and separator 26 towards the positive electrode 24. The electrons flow through the external circuit 40 and the lithium ions migrate across the separator 26 in the electrolyte 30 to form intercalated lithium at the positive electrode 24. The electric current passing through the external circuit 40 can be harnessed and directed through the load device 42 until the inserted lithium in the negative electrode 22 is depleted and the capacity of the lithium ion battery 20 is diminished.

The lithium ion battery 20 can be charged or re-powered/re-energized at any time by connecting an external power source to the lithium ion battery 20 to reverse the electrochemical reactions that occur during battery discharge. The connection of an external power source to the lithium ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with inserted lithium for consumption during the next battery discharge event. As such, a complete discharging event followed by a complete charging event is considered to be a cycle, where lithium ions are cycled between the positive electrode 24 and the negative electrode 22. The external power source that may be used to charge the lithium ion battery 20 may vary depending on the size, construction, and particular end-use of the lithium ion battery 20. Some notable and exemplary external power sources include, but are not limited to, an AC wall outlet and a motor vehicle alternator.

In many battery configurations, each of the negative current collector 32, negative electrode 22, the separator 26, positive electrode 24, and positive current collector 34 are prepared as relatively thin layers (for example, several microns or a millimeter or less in thickness) and assembled in layers connected in electrical parallel arrangement to provide a suitable energy package. The negative electrode current collector 32 and positive electrode current collector 34 respectively collect and move free electrons to and from an external circuit 40.

Furthermore, the battery 20 can include a variety of other components that while not depicted here are nonetheless known to those of skill in the art. For instance, the lithium ion battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. The battery 20 shown in FIG. 3 includes a liquid electrolyte 30 and shows representative concepts of battery operation.

As noted above, the size and shape of the lithium ion battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium ion cells or batteries to produce a greater voltage output and power density if it is required by the load device 42.

Accordingly, the battery 20 can generate electric current to a load device 42 that can be operatively connected to the external circuit 40. The load device 42 may be powered fully or partially by the electric current passing through the external circuit 40 when the lithium ion battery 20 is discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the battery 20 for purposes of storing energy.

The present technology pertains to improved electrochemical cells, especially lithium-ion batteries. In various instances, such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example.

A. Positive Electrode

The positive electrode 24 may be formed from a first electroactive material that can sufficiently undergo lithium intercalation and deintercalation while functioning as the positive terminal of the lithium ion battery 20. The positive electrode 24 may also include a polymeric binder material to structurally fortify the lithium-based active material and an electrically conductive material. One exemplary common class of known materials that can be used to form the positive electrode 24 is layered lithium transitional metal oxides. For example, in certain embodiments, the positive electrode 24 may comprise $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P \leq 1$, $x+y+z+p=1$ (NCMA); $LiNiMnCoO_2$; $Li_2Fe_xM_{1-x}PO_4$, (M=Mn and/or Ni, $0 \leq x \leq 1$); $LiMn_2O_4$; $LiFeSiO_4$; $LiNi_{0.6}Mn_{0.2}Co_{0.2}O_2$ (NMC622), $LiMnO_2$ (LMO), activated carbon, sulfur (e.g., greater than 60 wt % based on total weight of the positive electrode), or combinations thereof. Additionally or alternatively, the positive electrode 24 may include the lithium ion-exchanged zeolite particles as described herein, for example, as an additive.

It is contemplated herein that the first electroactive material may be in particle form and may have a round geometry or an axial geometry. The term "axial geometry" refers to particles generally having a rod, fibrous, or otherwise cylindrical shape having an evident long or elongated axis. Generally, an aspect ratio (AR) for cylindrical shapes (e.g., a fiber or rod) is defined as AR=L/D where L is the length of the longest axis and D is the diameter of the cylinder or fiber. Exemplary axial-geometry electroactive material particles suitable for use in the present disclosure may have high aspect ratios, ranging from about 10 to about 5,000, for example. In certain variations, the first electroactive material particles having an axial-geometry include fibers, wires, flakes, whiskers, filaments, tubes, rods, and the like.

The term "round geometry" typically applies to particles having lower aspect ratios, for example, an aspect ratio closer to 1 (e.g., less than 10). It should be noted that the particle geometry may vary from a true round shape and, for example, may include oblong or oval shapes, including prolate or oblate spheroids, agglomerated particles, polygonal (e.g., hexagonal) particles or other shapes that generally have a low aspect ratio. Oblate spheroids may have disc shapes that have relatively high aspect ratios. Thus, a generally round geometry particle is not limited to relatively low aspect ratios and spherical shapes.

Additionally or alternatively, the positive electrode 24 can optionally include an electrically conductive material and/or a polymeric binder. Examples of electrically conductive material include, but are not limited to, carbon black, graphite, acetylene black (such as KETCHEN™ black or DENKA™ black), carbon nanotubes, carbon fibers, carbon nanofibers, graphene, graphene nanoplatelets, graphene oxide, nitrogen-doped carbon, metallic powder (e.g., copper, nickel, steel or iron), liquid metals (e.g., Ga, GaInSn), a conductive polymer (e.g., include polyaniline, polythiophene, polyacetylene, polypyrrole, and the like) and combinations thereof. As used herein, the term "graphene nanoplatelet" refers to a nanoplate or stack of graphene layers. Such electrically conductive material in particle form may have a round geometry or an axial geometry as described above.

Examples of suitable polymeric binders, include but are not limited to, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), poly(acrylic acid) PAA, polyimide, polyamide, sodium alginate, lithium alginate, and combinations thereof. In some embodiments, the polymeric binder may be a non-aqueous solvent-based polymer or an aqueous-based polymer. In particular, the polymeric binder may be a non-aqueous solvent-based polymer that can demonstrate less capacity fade, provide a more robust mechanical network and improved mechanical properties to handle silicon particle expansion more effectively, and possess good chemical and thermal resistance. For example, the polymeric binder may include polyimide, polyamide, polyacrylonitrile, polyacrylic acid, a salt (e.g., potassium, sodium, lithium) of polyacrylic acid, polyacrylamide, polyvinyl alcohol, carboxymethyl cellulose, or a combination thereof. The first electroactive material may be intermingled with the electrically conductive material and/or at least one polymeric binder. For example, the first electroactive material and optional electrically conducting materials may be slurry cast with such binders and applied to a current collector. Polymeric binder can fulfill multiple roles in an electrode, including: (i) enabling the electronic and ionic conductivities of the composite electrode, (ii) providing the electrode integrity, e.g., the integrity of the electrode and its components, as well as its adhesion with the current collector, and (iii) participating in the formation of solid electrolyte interphase (SEI), which plays an important role as the kinetics of lithium intercalation is predominantly determined by the SEI.

In any embodiment, the first electroactive material may be present in the positive electrode in an amount, based on total weight of the positive electrode, of greater than or equal to about 50 wt. %, greater than or equal to about 60 wt. %, greater than or equal to about 70 wt. %, greater than or equal to about 80 wt. %, greater than or equal to about 90 wt. %, greater than or equal to about 95 wt. %, or about 99 wt. %; or from about 50 wt. % to about 99 wt. %, about 70 wt. % to about 99 wt. %, or about 90 wt. % to about 99 wt. %.

Additionally or alternatively, the electrically conductive material and the polymeric binder each may be independently present in the positive electrode in an amount, based on total weight of the positive electrode from about 0.5 wt. % to about 20 wt. %, about 1 wt. % to about 15 wt. %, or about 1 wt. % to about 10 wt. %.

B. Negative Electrode

The negative electrode 22 includes a second electroactive material as a lithium host material capable of functioning as a negative terminal of a lithium ion battery. The second electroactive material may comprise, lithium (e.g., metallic lithium), a lithium alloy, such as, but not limited to, lithium silicon alloy, a lithium aluminum alloy, a lithium indium alloy, a lithium tin alloy, or combinations thereof. The negative electrode 22 may optionally further include one or more of graphite, activated carbon, carbon black, hard carbon, soft carbon, graphene, silicon, tin oxide, aluminum, indium, zinc, germanium, silicon oxide, titanium oxide, lithium titanate, and combinations thereof, for example, silicon mixed with graphite. Non-limiting examples of silicon-containing electroactive materials include silicon (amorphous or crystalline), or silicon containing binary and ternary alloys, such as Si—Sn, SiSnFe, SiSnAl, SiFeCo, and the like. In other variations, the negative electrode 22 may be a metal film or foil, such as a lithium metal film or lithium-containing foil. The second electroactive material may be in particle form and may have a round geometry or an axial geometry as described above. Additionally or alternatively, the negative electrode 22 may include the lithium ion-exchanged zeolite particles as described herein, for example, as an additive.

Additionally, the negative electrode 22 can optionally include an electrically conductive material as described herein and/or a polymeric binder as described herein that improves the structural integrity of the electrode. For example, the second electroactive materials and electronically or electrically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), poly(acrylic acid) PAA, polyimide, polyamide, sodium alginate, or lithium alginate, and applied to a current collector. Examples of electrically conductive material include, but are not limited to, carbon black, graphite, acetylene black (such as KETCHEN™ black or DENKA™ black), carbon nanotubes, carbon fibers, carbon nanofibers, graphene, graphene nanoplatelets, graphene oxide, nitrogen-doped carbon, metallic powder (e.g., copper, nickel, steel or iron), liquid metals (e.g., Ga, GaInSn), a conductive polymer (e.g., include polyaniline, polythiophene, polyacetylene, polypyrrole, and the like) and combinations thereof.

In various aspects, the second electroactive material may be present in the negative electrode in an amount, based on total weight of the negative electrode from about 70 wt. % to about 99 wt. %, about 80 wt. % to about 98 wt. %, about 90 wt. % to about 99 wt. %, or about 95 wt. % to about 98 wt. %. Additionally or alternatively, the electrically conductive material and the polymeric binder each may be independently present in the negative electrode in an amount, based on total weight of the negative electrode from about 0.5 wt. % to about 15 wt. %, about 1 wt. % to about 10 wt. %, or about 1 wt. % to about 5 wt. %.

C. Currently Collectors

The first current collector 32 and the second current collector 34 may each comprise a metal comprising copper, aluminum, nickel, or alloys thereof, stainless steel, or other appropriate electrically conductive materials known to those of skill in the art. Additionally or alternatively, the first current collector 32 and the second current collector 34 may each be formed of or further include a carbon or a carbon and metal (e.g., silver (Ag), aluminum (Al), zinc (Zn)) composite coating layer, for example, having a thickness of about 500 nm to about 2 μm. In certain aspects, the first current collector 32 and/or the second current collector 34 may be in the form of a foil, slit mesh, and/or woven mesh.

D. Porous Separator

In any embodiment, the porous separator 26 may comprise any organic or inorganic material that can physically separate and electrically insulate a positive and negative electrode from each other while permitting the free flow of lithium ions therebetween. For example, the porous separator 26 may comprise composite material or a nonwoven material, e.g., a manufactured sheet, web, or matt of directionally or randomly oriented fibers, including but not limited to cotton, nylon, polyesters, glass and a combination thereof. As another example, the separator 26 may comprise a porous (e.g., microporous) polymeric material, e.g., a microporous polyolefin-based membrane or film. The porous separator 26 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly(vinyl chloride) (PVC). The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In some embodiments, the porous separator 26 may comprise a laminate of one or more polymeric materials, such as a laminate of PE and PP. Commercially available polyolefin porous separator substrates can include CELGARD® 2500 (a monolayer polypropylene separator) and CELGARD® 2325 (a trilayer polypropylene/polyethylene/polypropylene separator) available from Celgard LLC. Additionally or alternatively, the porous separator 26 may include the lithium ion-exchanged zeolite particles as described herein, for example, as a filler.

In other aspects, the porous separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the porous separator 26. The porous separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the porous separator 26 as a fibrous layer to help provide the porous separator 26 with appropriate structural and porosity characteristics. The porous separator 26 may have a thickness, in the range of about 4 μm to about 25 μm.

E. Coating Layer(s)

Figure 4:
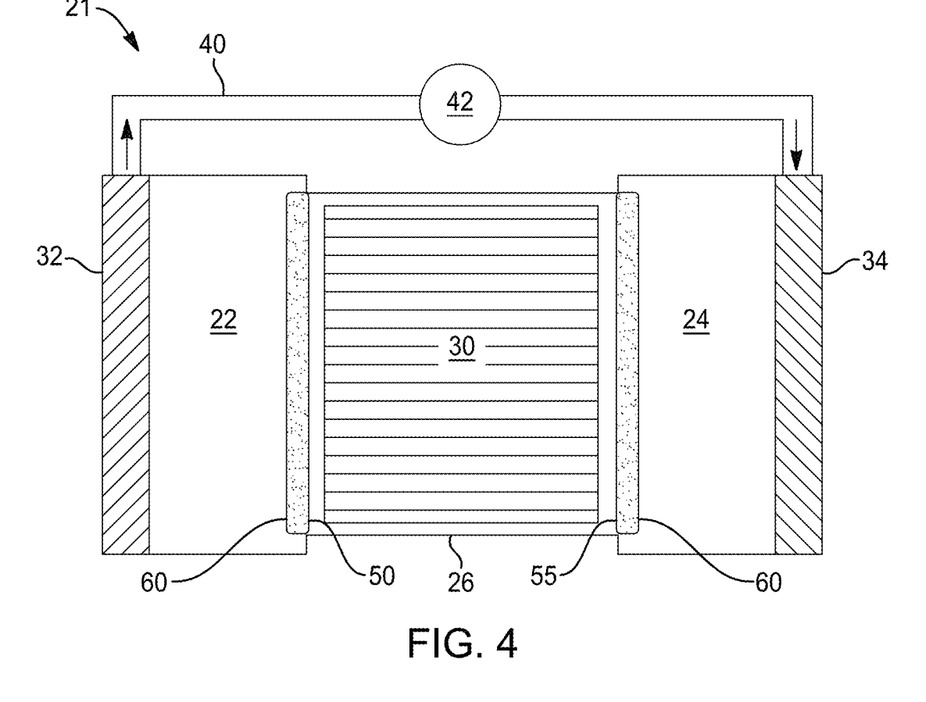
FIG. 4 is a schematic of another exemplary electrochemical battery according to the present disclosure.

In any embodiment, the porous separator may include a first coating layer comprising lithium ion-exchanged zeolite particles as described herein. For example, as shown in FIG. 4, in battery 21, the porous separator 26 may have a first side 50 and an opposing second side 55. The first coating layer 60 that includes lithium ion-exchanged zeolite particles may be present on one or both sides 50, 55 of the separator 26. In some embodiments, as shown in FIG. 4, the first side 50 and the second side 55 of the separator 26 may be coated with first coating layer 60. In assembly, the first coating layer 60 present on first side 50 faces toward and presses against the negative electrode 22, and the first coating layer 60 present on second side 55 faces toward and presses against the positive electrode 24. However, in other embodiments, the first side 50 of the separator 26 may be coated with the first coating layer 60 and the second side 55 of the separator 26 may be uncoated such that, in assembly, the second side 55 of the separator 26 faces toward and presses against the positive electrode 24. In other embodiments, the second side 55 of the separator 26 may be coated with the first coating layer 60 and the first side 50 of the separator 26 may be uncoated such that, in assembly, the first side 50 of the separator 26 faces toward and presses against the negative electrode 22. The first coating layer 60 may additionally include a polymeric binder material.

The first coating layer 60 may be continuously or discontinuously formed on the first and/or second sides 50, 55 of the separator 26. For example, the first coating layer 60 may be formed on the first side 50 of the separator 26 such that the first coating layer 60 covers an entire surface area or only a portion of the surface area on the first side 50 of the separator 26. Likewise, the first coating layer 60 may be formed on the second side 55 of the separator 26 such that the first coating layer 60 covers an entire surface area or only a portion of the surface area on the second side 55 of the separator 26. The first coating layer 60 may extend over the first and second sides 50, 55 of the separator 26 and, in some instances, may extend partway into the micropores of the separator 26.

Figure 5:
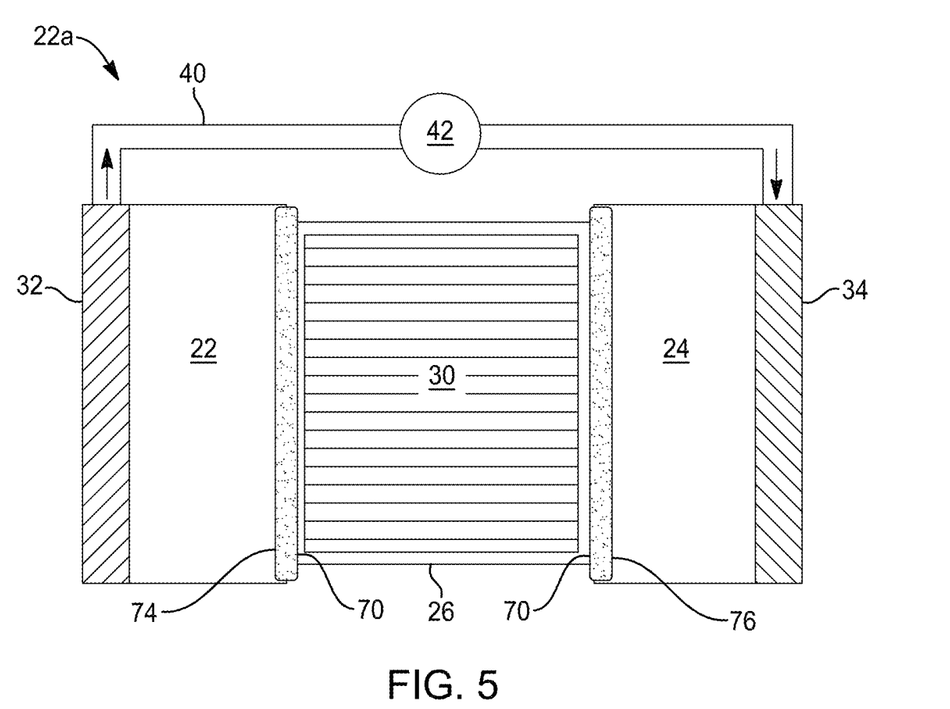
FIG. 5 is a schematic of another exemplary electrochemical battery according to the present disclosure.

Additionally or alternatively, the positive electrode, the negative electrode, or both may include a second coating layer comprising lithium ion-exchanged zeolite particles as described herein. For example, as shown in FIG. 5, in battery 22a, the negative electrode 22 may have a third side 74 and the positive electrode 24 may have a fourth side 76. The second coating layer 70 that includes lithium ion-exchanged zeolite particles may be present on one or both sides 74, 76 of the electrodes 22, 24. In some embodiments, as shown in FIG. 5, the third side 74 and the fourth side 76 may be coated with second coating layer 70. In assembly, the second coating layer 70 present on third side 74 faces toward and presses against the separator 26, and the second coating layer 70 present on fourth side 76 faces toward and presses against the separator 26. However, in other embodiments, the third side 74 of the of the negative electrode 22 may be coated with the second coating layer 70 and the fourth side 76 of the positive electrode 24 may be uncoated such that, in assembly, the fourth side 76 of the positive electrode 24 faces toward and presses against the separator 26. In other embodiments, the fourth side 76 of the positive electrode 24 may be coated with the second coating layer 70 and the third side 74 of the negative electrode 22 may be uncoated such that, in assembly, the third side 74 of the negative electrode 22 faces toward and presses against the separator 26. The second coating layer 70 may additionally include a polymeric binder material.

The second coating layer 70 may be continuously or discontinuously formed on each of sides 74, 76. For example, the second coating layer 70 may be formed on the third side 74 of the negative electrode 22 such that the second coating layer 70 covers an entire surface area or only a portion of the surface area on the third side 74 of the negative electrode 22. Likewise, the second coating layer 70 may be formed on the fourth side 76 of the positive electrode 24 such that the second coating layer 70 covers an entire surface area or only a portion of the surface area on the fourth side 76 of the positive electrode 24. The second coating layer 70 may extend over the third and fourth sides 74, 76 and, in some instances, may extend partway into the micropores of the electrode 22, 24.

In any embodiment, the first coating layer 60 and/or the second coating layer 70 may have thicknesses of less than or equal to about 25 µm, less than or equal to about 20 µm, less than or equal to about 10 µm, less than or equal to about 5 µm, less than or equal to about 1 µm, or about 50 nm. Additionally or alternatively, the first coating layer 60 and/or the second coating layer 70 may have thicknesses in the range of about 50 nm to about 20 µm, about 50 nm to about 10 µm, or about 50 nm to about 5 µm. As compared to the thickness of the separator 26, the thickness of the first coating layer 60 may be less than that of the separator 26. For example, the thickness of the first coating layer 60 may be 50% or less than the thickness of the separator 26.

The lithium ion-exchanged zeolite particles within first coating layer 60, the second coating layer 70, as an additive in electrodes 22, 24, and/or as a filler in separator 26, may be positioned within a lithium ion transport path through the electrochemical cells 20, 21, 22a. During operation of the electrochemical cells 20, 21, 22a, lithium ions can be communicated back and forth between the negative electrode 22 and the positive electrode 24 of the electrochemical cells 20, 21, 22a, and the lithium ion-exchanged zeolite particles may be positioned such that, during this back and forth movement, the lithium ions necessarily encounter one or more of the lithium ion-exchanged zeolite particles. The lithium ions may come into contact with or travel around or through the lithium ion-exchanged zeolite particles during their movement through the electrochemical cells 20, 21, 22a. The lithium ion-exchanged zeolite particles are formulated or selected, to adsorb, scavenge, entrap or otherwise inhibit the movement of certain target compounds within the electrochemical cells 20, 21, 22a, without adversely affecting the transport or net flow of lithium ions through the electrochemical cells 20, 21, 22a. For example, the particles of the lithium ion-exchanged zeolite particles may be formulated or selected based on the above-described pore size diameter, average particle size diameter, and/or cation content, to entrap or inhibit the movement of water molecules, polysulfide molecules, hydrogen ions, HF, and transition metal ions, such as $Mn^{2+}$ and $Fe^{2+/3+}$ ions, within the electrochemical cells 20, 21, 22a. The target compounds may be entrapped within the lithium ion-exchanged zeolite particles either physically, chemically, or both physically and chemically.

As such, including the lithium ion-exchanged zeolite particles within the cells 20, 21, 22a can help prevent a phenomenon referred to as "voltage droop," reduce capacity fade and impedance, improve Coulombic efficiency, help maintain uniform current distribution along the electrode/electrolyte interface, reduce corrosion, and prevent outgassing of the cells 20, 21, 22a.

Without intending to be bound by theory, it is believed that the lithium ion-exchanged zeolite particles may advantageously help improve the cycle performance of the electrochemical cells 20, 21, 22a, for example, by trapping trace water, scavenging hydrofluoric acid (HF), and/or blocking polysulfide migration. Immobilizing trace water molecules within the electrochemical cells, 20, 21, 22a may help prevent decomposition of the liquid electrolyte 30, which in turn may help prevent decomposition of the lithium-based intercalation host material of the positive electrode 24. Hydrofluoric acid is highly corrosive and may be generated in the electrochemical cells, 20, 21, 22a during decomposition of the electrolyte, in particular, by reaction of LiPF6 with water according to the following reaction equation (2):

$$LiPF_6 + H_2O \leftrightarrow LiF + POF_3 + 2HF \quad (2)$$

The as-produced HF may increase the acidity of the liquid electrolyte 30, which may lead to corrosion of the lithium-based intercalation host material of the positive electrode 24 and/or the current collectors 32, 34. Therefore, by functioning as an HF scavenger, the lithium ion-exchanged zeolite particles in the cells, 20, 21, 22a may help reduce corrosion and degradation of the various components of the cells, 20, 21, 22a.

Furthermore, it is believed that the lithium ion-exchanged zeolite particles in the cells, 20, 21, 22a may help improve the cycle performance of the electrochemical cells, 20, 21, 22a by trapping transition metal ions, such as $Mn^{2+}$ and $Fe^{2+/3+}$ ions, which may be present in the liquid electrolyte 30 due to decomposition of the lithium-based intercalation host material of the positive electrode 24 and/or due to the presence of transition metal impurities in the positive electrode 24. Also, the lithium ion-exchanged zeolite particles within the cells, 20, 21, 22a may help improve the robustness of the cells, 20, 21, 22a, for example, by improving the mechanical properties and thermal stability of the separator 26.

F. Electrolyte

The positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion batteries 20, 21. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion batteries 20, 21.

In certain aspects, the electrolyte 30 may be a non-aqueous liquid electrolyte solution that includes one or more lithium salts dissolved in an organic solvent or a mixture of organic solvents. For example, a non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane) sulfonylimide ($LiN(CF_3SO_2)_2$), lithium bis(fluorosulfonyl) imide ($LiN(FSO_2)_2$) (LiSFI), lithium (triethylene glycol dimethyl ether)bis(trifluoromethanesulfonyl)imide (Li(G3)(TFSI), lithium bis(trifluoromethanesulfonyl)azanide (LiTFSA), and combinations thereof.

These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane). One or more salts can be present in the electrolyte in a concentration (moles of salt per liter of solvent) ranging from greater than or equal to about 1 M, greater than or equal to about 2 M, greater than or equal to about 3 M, or about 4M, or from about 1 M to about 4 M, about 1 M to 2 M, about 2 M to about 4 M, or about 3 M to about 4 M.

Additionally or alternatively, the electrolyte may include additives, which can, for example, increase temperature and voltage stability of the electrochemical cell materials (e.g., electrolyte 30, negative electrode 22, and positive electrode 24). Examples of suitable additives include, but are not limited to, vinyl carbonate, vinyl-ethylene carbonate, propane sulfonate, and combinations therefore. Other additives can include diluents which do not coordinate with lithium ions but can reduce viscosity, such as bis(2,2,2-trifluoroethyl) ether (BTFE), and flame retardants, such as triethyl phosphate.

EXAMPLES

Example 1

Lithium ion-exchanged zeolite particles were prepared according to two methods. The first method was a conventional direct ion exchange between zeolite precursor particles and $Li^+$ cations. The second method was an ion exchange method according to the present disclosure. Unless otherwise indicated, zeolite powder (CBV 600; zeolite Y) with a $Na_2O$ weight ratio of 0.2% obtained from Zeolyst International was used as the zeolite precursor particles. LiOH and $(NH_4)_3PO_4$ were obtained from Sigma-Aldrich. The concentration (mol $L^{-1}$) of $Li^+$ or $NH_4^+$ cations was controlled to be about 10 times of $Na^+$ cations in the zeolite.

In the first method, the zeolite precursor particles were combined with an aqueous solution containing LiOH at 80° C. for 24 hours to form lithium ion-exchanged particles, which were then separated through vacuum filtration and washed with deionized water two times and finally dried at 100° C. overnight in a vacuum oven to obtain Comparative Zeolite Particles A. In the second method, the zeolite precursor particles were combined with an aqueous solution containing $(NH_4)_3PO_4$ at 80° C. for 24 hours to form a first mixture. To the first mixture, LiOH was added at 80° C. for 24 hours to form lithium ion-exchanged particles, which were then separated through vacuum filtration and washed with deionized water two times and finally dried at 100° C. overnight in a vacuum oven to obtain Zeolite Particles 1. The amount of cations present in Comparative Zeolite Particles A and Zeolite Particles 1 is shown below in Table 1.

TABLE 1

| Sample | $Na^+$ (at. %) | $Li^+$ (at. %) | N (at. %) |
|---|---|---|---|
| Comparative Zeolite Particles A | 0.1440 | 0.445 | <0.5 |
| Zeolite Particles 1 | 0.0517 | 0.567 | <0.5 |

Figure 6:
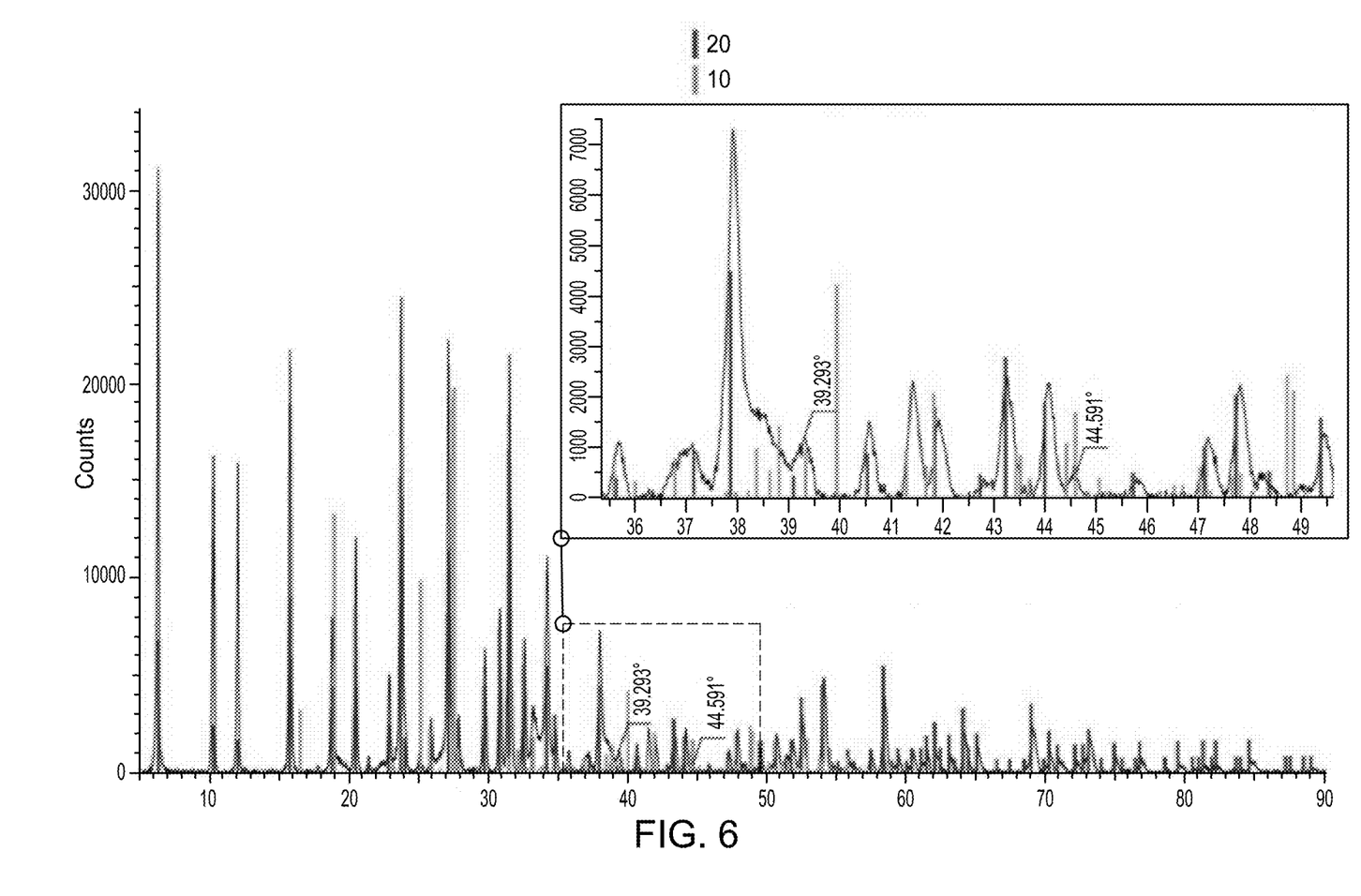
FIG. 6 is an X-ray diffraction (XRD) for a lithium ion-exchanged zeolite particles.

As shown in Table 1, the second method resulted in more Li$^+$ cations present in the Zeolite Particles 1 as well as fewer Na$^+$ cations. X-ray diffraction (XRD) analysis of the Zeolite Particles 1 was also performed and confirmed the presence Li$_3$PO$_4$ (10) within in the Zeolite Particles 1 (20). FIG. 6 shows the XRD graph for Zeolite Particles 1.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lithium ion-exchanged zeolite particle comprising:
   cages defined by 8-membered rings, 9-membered rings, 10-membered rings, 12-membered rings or a combination thereof, wherein Li$_3$PO$_4$ is present within the cages; and
   Li$^+$ and NH$_4^+$ cations; and
   wherein the lithium ion-exchanged zeolite particle comprises (i) less than or equal to about 0.1 at % of one or more of Na$^+$, K$^+$, Mg$^{2+}$, or Ca$^+$; and (ii) NH$_4^+$ in an amount greater than an amount of the one or more of Na$^+$, K$^+$, Mg$^{2+}$, or Ca$^+$.

2. The lithium ion-exchanged zeolite particle of claim 1, wherein the lithium ion-exchanged zeolite particle comprises a zeolite material having a framework type selected from the group consisting of NAT, EDI, THO, ANA, YUG, GOO, MON, HEU, STI, BRE, FAU, MFI, LTL, LTA, and a combination thereof.

3. The lithium ion-exchanged zeolite particle of claim 1, wherein the lithium ion-exchanged zeolite particles comprise a zeolite material selected from the group consisting of zeolite A, zeolite Y, zeolite L, ZSM-5, and a combination thereof.

4. An electrochemical cell comprising:
   a positive electrode comprising a first electroactive material;
   a negative electrode spaced apart from the positive electrode, wherein the negative electrode comprises a second electroactive material;
   a porous separator disposed between confronting surfaces of the negative electrode and the positive electrode;
   a liquid electrolyte infiltrating one or more of the negative electrode, the positive electrode, and the porous separator; and
   lithium ion-exchanged zeolite particles comprising:
      cages defined by 8-membered rings, 9-membered rings, 10-membered rings, 12-membered rings or a combination thereof, wherein Li$_3$PO$_4$ is present within the cages; and
      Li$^+$ and NH$_4^+$ cations; and
      wherein the lithium ion-exchanged zeolite particles comprise (i) less than or equal to about 0.1 at % of one or more of Na$^+$, K$^+$, Mg$^{2+}$, or Ca$^+$; and (ii) NH$_4^+$ in an amount greater than an amount of the one or more of Na$^+$, K$^+$, Mg$^{2+}$, or Ca$^+$.

5. The electrochemical cell of claim 4, wherein the lithium ion-exchanged zeolite particles are present as one or more of the following:
   (i) a first coating layer present on a first side, a second side or both the first and second sides of the porous separator;
   (ii) a filler in the porous separator;
   (iii) an additive in the positive electrode, the negative electrode, or both; and
   (iv) a second coating layer present on a third side of the negative electrode, on a fourth side of the positive electrode or both the third side of the negative electrode and the fourth side of the positive electrode.

6. The electrochemical cell of claim 1, wherein the lithium ion-exchanged zeolite particles comprise a zeolite material having a framework type selected from the group consisting of NAT, EDI, THO, ANA, YUG, GOO, MON, HEU, STI, BRE, FAU, MFI, LTL, LTA, and a combination thereof.

7. The electrochemical cell of claim 4, wherein the lithium ion-exchanged zeolite particles comprise a zeolite material selected from the group consisting of zeolite A, zeolite Y, zeolite L, ZSM-5, and a combination thereof.

8. The electrochemical cell of claim 4, wherein the first electroactive material is selected from the group consisting of Li$_{(1+x)}$Mn$_2$O$_4$, where $0.1 \leq x \leq 1$; LiMn$_{(2-x)}$Ni$_x$O$_4$, where $0 \leq x \leq 0.5$; LiCoO$_2$; Li(Ni$_x$Mn$_y$Co$_z$)O$_2$, where $0 \leq x \leq 1$, $0 \leq y \leq 1$, $0 \leq z \leq 1$, and $x+y+z=1$; LiNi$_{(1-x-y)}$CO$_x$M$_y$O$_2$, where $0<x<0.2$, $y<0.2$, and M is Al, Mg, or Ti; LiFePO$_4$, LiMn$_{2-x}$Fe$_x$PO$_4$, where $0<x<0.3$; LiNiCoAlO$_2$; LiMPO$_4$, where M is at least one of Fe, Ni, Co, and Mn; Li(Ni$_x$Mn$_y$Co$_z$Al$_p$)O$_2$, where $0 \leq x \leq 1$, $0 \leq y \leq 1$, $0 \leq z \leq 1$, $0 \leq P \leq 1$, $x+y+z+p=1$ (NCMA); LiNiMnCoO$_2$; Li$_2$Fe$_x$M$_{1-x}$PO$_4$, where M is Mn and/or Ni, $0 \leq x \leq 1$; LiMn$_2$O$_4$; LiFeSiO$_4$; LiNi$_{0.6}$Mn$_{0.2}$Co$_{0.2}$O$_2$ (NMC622), LiMnO$_2$ (LMO), activated carbon, sulfur, and a combination thereof.

9. The electrochemical cell of claim 4, wherein the second electroactive material comprises lithium, a lithium silicon alloy, a lithium aluminum alloy, a lithium indium alloy, a lithium tin alloy, graphite, activated carbon, carbon black, hard carbon, soft carbon, graphene, silicon, tin oxide, aluminum, indium, zinc, germanium, silicon oxide, titanium oxide, lithium titanate, or a combination thereof.

10. The electrochemical cell of claim 4, wherein the porous separator comprises a composite material, a polymeric material, a nonwoven material, or a combination thereof.

11. A method of preparing lithium ion-exchanged zeolite particles, the method comprising:
   (a) combining precursor zeolite particles with (NH$_4$)$_3$PO$_4$ to form a first mixture comprising intermediate zeolite particles, wherein the precursor zeolite particles comprise a cation selected from the group consisting of H$^+$, NH$_4^+$, Na$^+$, K$^+$, Mg$^{2+}$, Ca$^+$, and a combination thereof; and
   (b) performing one of the following:
      (i) adding a lithium salt to the first mixture to form the lithium ion-exchanged zeolite particles, or
      (ii) separating the intermediate zeolite particle from the first mixture and combining the intermediate zeolite particles with the lithium salt to form the lithium ion-exchanged zeolite particles; and
   wherein the lithium ion-exchanged zeolite particles comprise; cages defined by 8-membered rings, 9-membered rings, 10-membered rings, 12-membered rings or a combination thereof, wherein Li$_3$PO$_4$ is present within the cages; and Li$^+$ and NH$_4^+$ cations; and wherein the lithium ion-exchanged zeolite particle comprises (i) less than or equal to about 0.1 at % of one or more of $Na^+$, $K^+$, $Mg^{4+}$, or $Ca^+$; and (ii) $NH_4^+$ in an amount greater than an amount of the one or more of $Na^+$, $K^+$, $Mg^{4+}$, or $Ca^+$.

12. The method of claim 11, wherein the lithium ion-exchanged zeolite particles further comprise $Li_3PO_4$ present on an exterior surface of the lithium ion-exchanged zeolite particles.

13. The method of claim 11, wherein the lithium ion-exchanged zeolite particles comprise a zeolite material having a framework type selected from the group consisting of NAT, EDI, THO, ANA, YUG, GOO, MON, HEU, STI, BRE, FAU, MFI, LTL, LTA, and a combination thereof.

14. The method of claim 11, wherein the lithium ion-exchanged zeolite particles comprise a zeolite material selected from the group consisting of zeolite A, zeolite Y, zeolite L, ZSM-5, and a combination thereof.

15. The method of claim 11, wherein the precursor zeolite particles comprise $Na^+$, $H^+$, and/or $K^+$ cations and/or the intermediate zeolite particle comprise $NH_4^+$ cations.

16. The method of claim 11, wherein the lithium salt is selected from the group consisting of lithium hydroxide, lithium carbonate, lithium chloride, lithium nitrate, lithium sulfate, and a combination thereof.

17. The method of claim 11, wherein the combining the precursor zeolite particles with $(NH_4)_3PO_4$, the adding the lithium salt to the first mixture to form the lithium ion-exchanged zeolite particles, and the combining the intermediate zeolite particles with the lithium salt to form the lithium ion-exchanged zeolite particles are each performed at a temperature of about 18° C. to about 120° C.

18. The method of claim 11, further comprising performing one or more:

(c) separating the lithium ion-exchanged zeolite particles; and (d) heating the lithium ion-exchanged zeolite particles.

19. The method of claim 18, wherein the heating is performed at a temperature of greater than or equal to about 100° C.

* * * * *